(12) United States Patent
LaFranchi

(10) Patent No.: US 11,080,939 B1
(45) Date of Patent: Aug. 3, 2021

(54) GENERATING TEST CASES FOR AUGMENTED REALITY (AR) APPLICATION TESTING

(71) Applicant: Charter Communications Operating, LLC, St. Louis, MO (US)

(72) Inventor: Richard LaFranchi, Boulder, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/075,458

(22) Filed: Oct. 20, 2020

(51) Int. Cl.
 *G06T 19/00* (2011.01)
 *G06T 19/20* (2011.01)

(52) U.S. Cl.
 CPC ............ *G06T 19/006* (2013.01); *G06T 19/20* (2013.01); *G06T 2219/2016* (2013.01)

(58) Field of Classification Search
 None
 See application file for complete search history.

(56) References Cited

U.S. PATENT DOCUMENTS

| | | | |
|---|---|---|---|
| 7,577,902 B2 * | 8/2009 | Hong | G06F 40/171 715/232 |
| 2017/0221247 A1 * | 8/2017 | Severn | G09G 5/00 |
| 2018/0190375 A1 * | 7/2018 | Chapela | A61B 5/486 |

OTHER PUBLICATIONS

Newman et al. Ubiquitous Tracking for Augmented Reality, Dec. 2004, 1-10, (Year: 2004).*
LaFranchi, Richard, "Systematic Test Case Generation for Augmented RealityApplications," Mar. 11, 2020, pp. 1-13.
Memon, Atif, et al., "Automating Regression Testing for Evolving GUI Software," Journal of Software Maintenance and Evolution: Research and Practice 17 (1), 2005, Available online at https://www.cs.umd.edu/~atif/papers/MemonJSME2005.pdf, pp. 1-36.
Memon, Atif, "A Comprehensive Framework for Testing Graphical User Interfaces," University of Pittsburgh, 2001, Available online at https://www.cs.umd.edu/~atif/papers/MemonPHD2001.pdf, 139 pages.

(Continued)

*Primary Examiner* — Robert J Craddock
(74) *Attorney, Agent, or Firm* — Withrow & Terranova, PLLC

(57) ABSTRACT

Generating test cases for augmented reality (AR) application testing is disclosed. In one embodiment, an AR computing device constructs a virtual object hierarchy comprising a plurality of nodes corresponding to a plurality of virtual objects of a test AR environment. The AR computing device next generates an event-flow graph based on the virtual object hierarchy, wherein the event-flow graph comprises a directed graph comprising a plurality of vertices, wherein each vertex corresponds to an event supported by a virtual object of the plurality of virtual objects, and a plurality of edges, wherein each edge connects two (2) vertices of the plurality of vertices. The AR computing device then identifies a plurality of paths based on the event-flow graph, wherein each path comprises one or more edges of the plurality of edges. The paths are then stored as a plurality of test cases (e.g., for use as input during subsequent testing).

20 Claims, 10 Drawing Sheets

(56) References Cited

OTHER PUBLICATIONS

Memon, Atif, "An Event-Flow Model of GUI-Based Applications for Testing," Software Testing, Verification and Reliability, 17, 2007, Available online at https://www.cs.umd.edu/~atif/papers/MemonSTVR2007.pdf, pp. 137-157.

Memon, Atif, et al., "GUI Ripping—Reverse Engineering of Graphical User Interfaces for Testing," 10th Working Conference on Reverse Engineering, 2003, WCRE 2003, Available online at https://www.cs.umd.edu/~atif/papers/MemonWCRE2003.pdf, pp. 260-269.

* cited by examiner

```
Input : A Virtual Object or Node in the AR Environment
Output: No output, structure of the forest is updated at each level
Function DFS-AR-Recursive (node)
    if isExecutable(node) then
        /* Virtual objects may support one or more different types of events    */
        for eventType in eventTypesFor(node) do
            execute(node, eventType);
            /* Execute the event on the node    */
            /* invokedNodes() is a method that finds any new virtual objects in the AR
               Window that appear                                                */
            children = invokedNodes();
            /* Update the structure so that invoked nodes are added as children to the
               current node                                                      */
            node.addChildren(children);
            for child in children do
                DFS-AR-Recursive(child);
```

FIG. 6

Input : The event-flow graph, a source event, a destination event, a path list holding the sequence of events, a paths list holding a list of paths
Output: No output, the paths list holds the list of tests generated
Function *getAllPaths (graph, source, destination, path, paths)*
　source.visited = true;
　path.append(source);
　if *source == destination* then
　　paths.append(path);
　else
　　for *neighbor in graph.neighbors(source)* do
　　　if *neighbor.visited == false* then
　　　　getAllPaths*(graph, neighbor, destination, path, paths)*;
　path.pop();
　source.visited = false;

GENERATING TEST CASES FOR AUGMENTED REALITY (AR) APPLICATION TESTING

BACKGROUND

Augmented reality (AR) generally refers to technologies for overlaying computer-generated digital information or virtual objects onto a representation of a non-virtual real-world environment. AR can provide an immersive experience in which a user perceives virtual elements as being integrated into the real-world environment. However, the sheer number of possible interactions with virtual objects in an AR environment poses challenges to effectively and efficiently testing AR applications.

SUMMARY

The embodiments disclosed herein generate test cases for augmented reality (AR) application testing by analyzing virtual objects within a test AR environment generated by an AR application, identifying events supported by the virtual objects, and generating paths (i.e., sequences of events) that may be stored and used as input for subsequent testing of the AR application.

In one embodiment, a method is provided. The method includes constructing, by an AR computing device, a virtual object hierarchy comprising a plurality of nodes corresponding to a plurality of virtual objects of a test AR environment. The method further includes generating an event-flow graph based on the virtual object hierarchy, wherein the event-flow graph comprises a directed graph comprising a plurality of vertices, wherein each vertex corresponds to an event supported by a virtual object of the plurality of virtual objects, and a plurality of edges, wherein each edge connects two (2) vertices of the plurality of vertices. The method also includes identifying a plurality of paths based on the event-flow graph, wherein each path comprises one or more edges of the plurality of edges. The method additionally includes storing the plurality of paths as a plurality of test cases.

In another embodiment, an AR computing device is provided. The AR computing device includes a system memory, and a processor device communicatively coupled to the system memory. The processor device is configured to construct a virtual object hierarchy comprising a plurality of nodes corresponding to a plurality of virtual objects of a test AR environment. The processor device is further configured to generate an event-flow graph based on the virtual object hierarchy, wherein the event-flow graph comprises a directed graph comprising a plurality of vertices, wherein each vertex corresponds to an event supported by a virtual object of the plurality of virtual objects, and a plurality of edges, wherein each edge connects two (2) vertices of the plurality of vertices. The processor device is also configured to identify a plurality of paths based on the event-flow graph, wherein each path comprises one or more edges of the plurality of edges. The processor device is additionally configured to store the plurality of paths as a plurality of test cases.

In another embodiment, a non-transitory computer-readable medium is provided. The non-transitory computer-readable medium stores computer-executable instructions that, when executed, cause a processor device of an AR computing device to construct a virtual object hierarchy comprising a plurality of nodes corresponding to a plurality of virtual objects of a test AR environment. The computer-executable instructions further cause the processor device to generate an event-flow graph based on the virtual object hierarchy, wherein the event-flow graph comprises a directed graph comprising a plurality of vertices, wherein each vertex corresponds to an event supported by a virtual object of the plurality of virtual objects, and a plurality of edges, wherein each edge connects two (2) vertices of the plurality of vertices. The computer-executable instructions also cause the processor device to identify a plurality of paths based on the event-flow graph, wherein each path comprises one or more edges of the plurality of edges. The computer-executable instructions additionally cause the processor device to store the plurality of paths as a plurality of test cases.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 6 illustrates an exemplary algorithm that may be employed to generate a virtual object hierarchy, such as the virtual object hierarchy of FIG. 3, in accordance with some embodiments;

FIG. 7 illustrates an exemplary algorithm that may be employed to identify paths (such as the paths of FIG. 5) within an event-flow graph (such as the event-flow graph of FIG. 4), in accordance with some embodiments;

DETAILED DESCRIPTION

Figure 1:
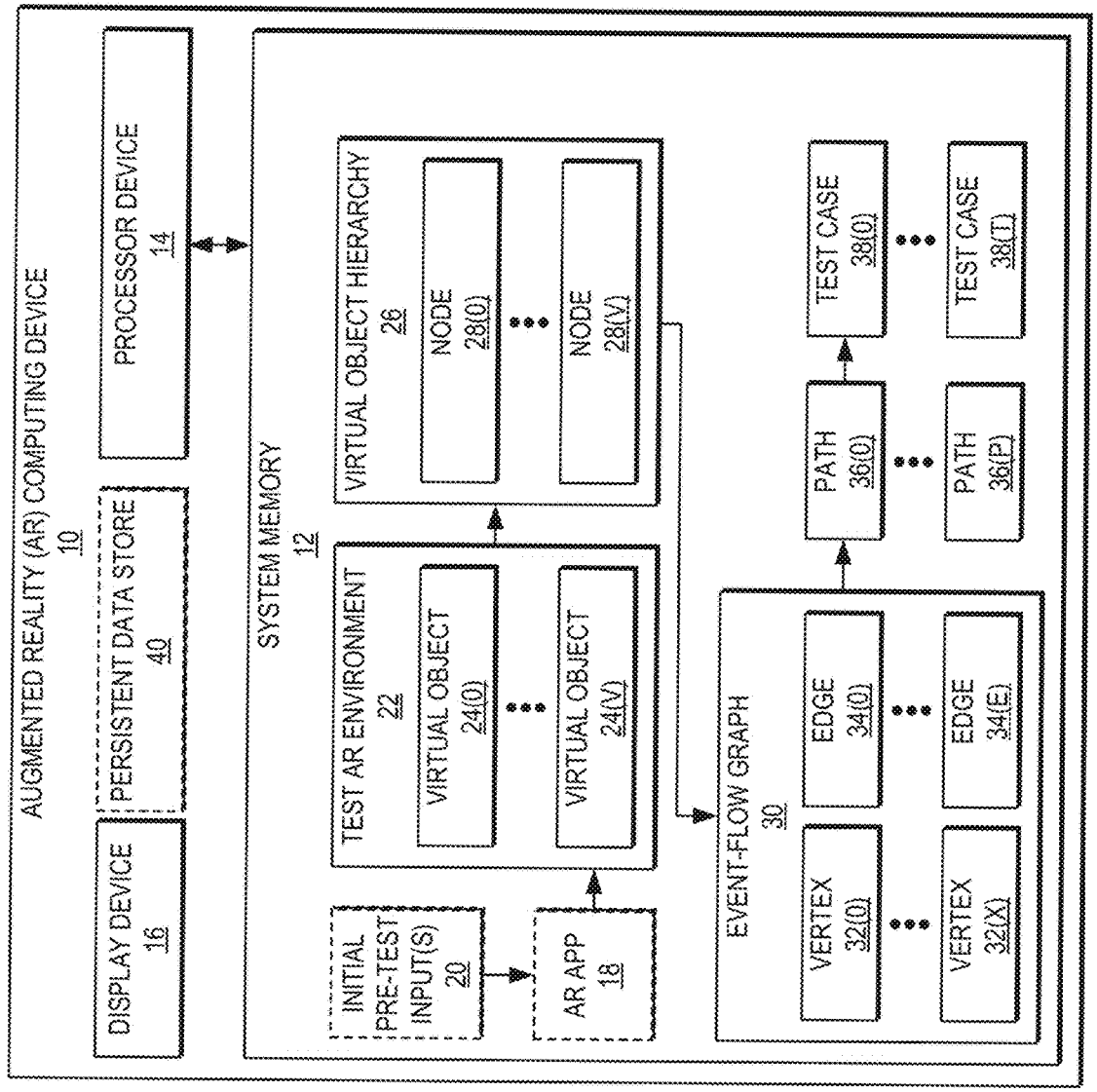
FIG. 1 is a block diagram illustrating an exemplary augmented reality (AR) computing device, configured to generate test cases for AR application testing.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, augmented reality (AR) refers herein to technologies for overlaying computer-generated digital information or virtual objects onto a representation of a non-virtual real-world environment. Computing devices that provide AR functionality (referred to herein as "AR computing devices") may include any computing device that provides a processor device, a display device (such as a screen, a head-mounted display (HMD), eyeglasses, and/or the like, as non-limiting examples), an input device, appropriate sensors for detecting position and movement of the computing device (e.g., accelerometers, compasses, positioning systems, and/or the like, as non-limiting examples), and appropriate software (i.e., an "AR application"). An AR application may provide an immersive experience allowing a user to perceive an AR environment in which virtual elements are integrated into or overlaid onto the real-world environment (in contrast with "virtual reality," in which the entire virtual environment perceived by the user is computer-generated). However, the sheer number of possible ways in which a user can interact with virtual objects in an AR environment poses challenges to effectively and efficiently testing AR applications.

In this regard, embodiments disclosed herein generate test cases for AR application testing. In some embodiments, a user may first use an AR computing device to generate a test AR environment based on one or more initial pre-test inputs (or "prefix values"). The pre-test inputs may include, for example, inputs to direct the AR computing device to display the test AR environment comprising a real-world environment with virtual objects overlaid on the real-world environment. The AR computing device then constructs a virtual object hierarchy comprising a plurality of nodes corresponding to a plurality of virtual objects of the test AR environment. The term "virtual object hierarchy" and derivations thereof are used herein to refer to any data structure that comprises multiple constituent data structures (i.e., "nodes") that indicate hierarchical relationships among the test AR environment and the virtual objects therein and that include identifying information and attributes for the corresponding virtual objects. Thus, each of the plurality of nodes of the virtual object hierarchy corresponds to one of the virtual objects within the test AR environment and is arranged within the virtual object hierarchy to indicate its relationship with other nodes. For example, a virtual wall within the test AR environment may include other virtual objects, such as a virtual window and a virtual door. Thus, in the virtual object hierarchy, a parent node may represent the virtual wall, while child nodes of the parent node may represent the virtual window and the virtual door.

Some embodiments may provide that the virtual object hierarchy is constructed by performing a depth-first traversal of each virtual object within the test AR environment. The depth-first traversal may be performed, e.g., by identifying a virtual object, adding a node corresponding to the virtual object to the plurality of nodes of the virtual object hierarchy, identifying any child virtual objects of the virtual object, adding child nodes corresponding to the child virtual objects to the plurality of nodes, and so on in recursive fashion.

The AR computing device next generates an event-flow graph based on the virtual object hierarchy. The term "event-flow graph" and derivations thereof are used herein to refer to a directed graph comprising a plurality of vertices that each correspond to an event supported by a virtual object within the test AR environment and a plurality of edges that each connect two (2) vertices of the plurality of vertices. The term "event" and derivations thereof are used herein to refer to an AR-application-generated indication resulting from an interaction between a user of the AR computing device and a virtual object within the AR test environment. Each event may comprise, as non-limiting examples, a select event, a translate event, a rotate event, or a gesture event, each of which may result from the user performing an action on or providing an input directed to a particular target virtual object.

The AR computing device then identifies a plurality of paths based on the event-flow graph, where each of the paths includes one or more edges (e.g., connecting a source vertex and a destination vertex among the plurality of vertices of the event-flow graph). In some embodiments, the plurality of paths may include every possible sequence of events that can be performed using the virtual objects within the test AR environment, and consequently may include a very large number of paths. Accordingly, the AR computing device in some such embodiments may reduce the number of paths by identifying one or more infeasible paths among the plurality of paths. An "infeasible path" may be a path that represents an impracticable sequence of events (such as attempting to perform a move operation on a particular virtual object before performing a select operation on the virtual object), and in some embodiments may be identified using an artificial intelligence (AI)-based algorithm. The identified infeasible path(s) may then be removed from the plurality of paths by the AR computing device. Some embodiments may provide that operations for identifying the plurality of paths may include using an AI-based algorithm to identify optimal paths for testing (e.g., paths that the AI-based algorithm considers most likely to provide the broadest testing coverage).

Finally, the AR computing device stores the plurality of paths as a plurality of test cases (i.e., for future unit testing of the AR application). The plurality of test cases may be stored on, e.g., a persistent data store of the AR computing device, and may be stored in any format convenient for testing purposes. The plurality of test cases may subsequently be used for manual testing of the AR application by a user and/or may be used as input for automated AR application testing.

FIG. 1 is a block diagram illustrating an exemplary AR computing device 10 that may be utilized to generate test cases for AR application testing in accordance with some embodiments. The AR computing device 10 comprises a system memory 12, a processor device 14 communicatively coupled to the system memory 12, and a display device 16. The AR computing device 10 in some embodiments is configured to execute an AR application ("AR APP") 18, which comprises an executable application for displaying AR environments that include a real-world environment on which virtual objects are overlaid (e.g., using the display device 16). The functionality described herein for generating test cases for AR application testing may be performed by the AR application 18 in some embodiments.

The AR computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the AR computing device 10 may include more or fewer elements than illustrated in FIG. 1. For example, the processor device 14 may further include one or more functional units, instruction caches, unified caches, memory controllers, interconnect buses, and/or additional memory devices, caches, and/or controller circuits, which are omitted from FIG. 1 for the sake of clarity.

In exemplary operation, the AR computing device 10 in the example of FIG. 1 may prepare to generate test cases for AR application testing by first receiving one or more initial pre-test inputs 20 (e.g., using the AR application 18). The initial pre-test input(s) 20 (also referred to as "prefix values") may include any inputs to the AR application 18 necessary to direct the AR application 18 to generate and display a test AR environment 22 that comprises a plurality of virtual objects 24(0)-24(V) overlaid over a real-world environment. Thus, for example, a user may use the AR computing device 10 and the AR application 18 to display a real-world environment including a house, and may provide the initial pre-test inputs 20 to cause the AR application 18 to superimpose the virtual objects 24(0)-24(V) (e.g., virtual walls and virtual corners, as non-limiting examples) over the real-world house in the test AR environment 22. An example of a test AR environment such as the test AR environment 22 of FIG. 1 is discussed below in greater detail with respect to FIG. 2.

After receiving the initial pre-test input(s) 20, the AR computing device 10 generates the test AR environment 22, including the plurality of virtual objects 24(0)-24(V). The virtual objects 24(0)-24(V) may include any interactive or non-interactive virtual objects that are rendered and displayed within the test AR environment 22 and for which unit testing will be performed. Interactive virtual objects among the plurality of virtual objects 24(0)-24(V) may provide support for events (including, as non-limiting examples, a select event, a translate event, a rotate event, or a gesture event) that result from user input indicating a corresponding action on the interactive virtual object.

The AR computing device 10 next generates a virtual object hierarchy 26 comprising a plurality of nodes 28(0)-28(V), each of which corresponds to one of the virtual objects 24(0)-24(V). The virtual object hierarchy 26 may comprise any data structure that comprises multiple constituent data structures (i.e., nodes) that indicate hierarchical relationships among the test AR environment 22 and the virtual objects 24(0)-24(V) therein, and may also include identifying information and attributes for the corresponding virtual objects 24(0)-24(V). Thus, the virtual object hierarchy 26 indicates any parent-child relationships that may exist among the virtual objects 24(0)-24(V) of the test AR environment 22. For example, a virtual object 24(0) may be a composite virtual object, such as a virtual wall, that is made up of a virtual object 24(1) (e.g., a virtual window) and a virtual object 24(2) (e.g., a virtual door). As a result, in the plurality of nodes 28(0)-28(V) of the virtual object hierarchy 26, the virtual object 24(0) may be represented by a parent node 28(0), while the virtual objects 24(1) and 24(2) may be represented by child nodes 28(1) and 28(2) that are children of the parent node 28(0). An example of a virtual object hierarchy such as the virtual object hierarchy 26 of FIG. 1 is discussed in greater detail below with respect to FIG. 3.

The virtual object hierarchy 26 is then used by the AR computing device 10 to generate an event-flow graph 30. The event-flow graph 30 is a directed flow graph that includes a plurality of vertices 32(0)-32(X) and a plurality of edges 34(0)-34(E). Each vertex of the plurality of vertices 32(0)-32(X) represents an event supported by the virtual objects 24(0)-24(V) of the test AR environment 22. In some embodiments, the events corresponding to the plurality of vertices 32(0)-32(X) may be identified by traversing the plurality of nodes 28(0)-28(V) of the virtual object hierarchy 26, and querying the AR application 18 (e.g., using an application programming interface (API) or similar mechanism) to identify events supported by the virtual objects 24(0)-24(V) corresponding to the nodes 28(0)-28(V). Each of the plurality of edges 34(0)-34(E) connects two (2) of the vertices 32(0)-32(X), such that every possible connection between pairs of the vertices 32(0)-32(X) is represented by the edges 34(0)-34(E). An example of an event-flow graph such as the event-flow graph 30 of FIG. 1 is discussed in greater detail below with respect to FIG. 4.

The AR computing device 10 next identifies a plurality of paths 36(0)-36(P) based on the event-flow graph 30. Each of the plurality of paths 36(0)-36(P) includes one or more of the edges 34(0)-34(E) representing a path between two of the vertices 32(0)-32(X) (e.g., a source vertex and a destination vertex among the plurality of vertices 32(0)-32(X)). An example of paths such as the plurality of paths 36(0)-36(P) of FIG. 1 is discussed in greater detail below with respect to FIG. 5.

According to some embodiments, the plurality of paths 36(0)-36(P) may include every possible sequence of events that can be performed using the virtual objects 24(0)-24(V) within the test AR environment 22. As a result, the plurality of paths 36(0)-36(P) may include a very large number of paths, particularly in embodiments in which the test AR environment 22 includes a large number of virtual objects 24(0)-24(V) and/or the virtual objects 24(0)-24(V) support a large number of events. In some such embodiments, the AR computing device 10 may reduce the number of the paths 36(0)-36(P) by identifying one or more infeasible paths (e.g., paths representing impracticable or impossible-to-perform sequences of events) among the plurality of paths 36(0)-36(P), and then removing the infeasible paths from the plurality of paths 36(0)-36(P). Some embodiments may provide that operations for identifying the plurality of paths 36(0)-36(P) and/or for identifying infeasible paths among the plurality of paths 36(0)-36(P) may be based on an AI-based algorithm trained to identify optimal paths for testing.

Finally, the AR computing device 10 stores the plurality of paths 36(0)-36(P) as a plurality of test cases 38(0)-38(T) for use in future unit testing of the AR application 18. The plurality of test cases 38(0)-38(T) may be stored on, e.g., a persistent data store 40 of the AR computing device 10, and may be stored in any format convenient for use as test inputs. The plurality of test cases 38(0)-38(T) may subsequently be used for manual testing of the AR application 18 by a user, and/or may be used as input for automated unit testing of the AR application 18. For instance, a tester (not shown), using the AR application 18, may perform the sequence of events represented by each test case of the plurality of test cases 38(0)-38(T) to confirm that a result of each test case matches design specifications and/or a desired output of the AR application 18.

Figure 2:
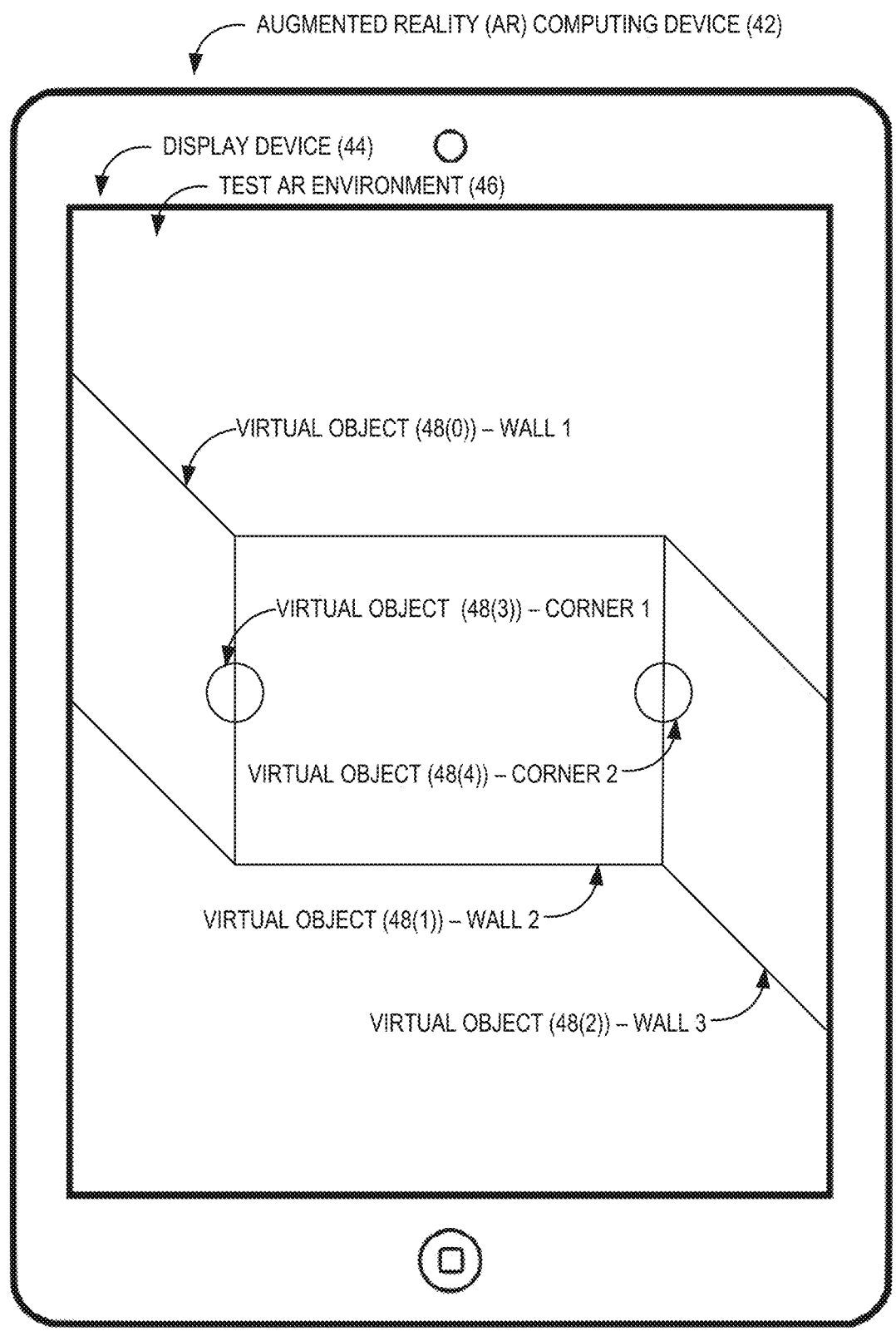
FIG. 2 illustrates an exemplary user interface provided by an AR computing device such as the AR computing device of FIG. 1 for generating and displaying a test AR environment containing virtual objects, in accordance with some embodiments.

To illustrate exemplary user interfaces provided by the AR computing device 10 of FIG. 1 for generating and displaying a test AR environment such as the test AR environment 22 of FIG. 1 in accordance with some embodiments, FIG. 2 is provided. In FIG. 2, an AR computing device 42, corresponding in functionality to the AR computing device 10 of FIG. 1, is shown. The AR computing device 42 includes a display device 44, via which a user (not shown) can view a test AR environment 46. As seen in FIG. 2, a total of five (5) virtual objects 48(0)-48(4) are visible within the test AR environment 46 shown on the display device 44. The virtual objects 48(0)-48(2) represent three virtual walls, while the virtual objects 48(3) and 48(4) represent virtual corners of the virtual walls.

According to some embodiments, the test AR environment 46 containing the virtual objects 48(0)-48(4) may be generated when a user provides initial pre-test inputs (e.g., the initial pre-test inputs 20 of FIG. 1) to the AR computing device 42. For instance, the user may direct the AR computing device 42 to display a real-world environment (not shown) to cause the AR computing device 42 to generate the virtual objects 48(0)-48(4) and superimpose the virtual objects 48(0)-48(4) over the real-world environment in the test AR environment 46). The AR computing device 42 subsequently may generate a virtual object hierarchy (e.g., the virtual object hierarchy 26 of FIG. 1) based on the test AR environment 46.

Figure 3:
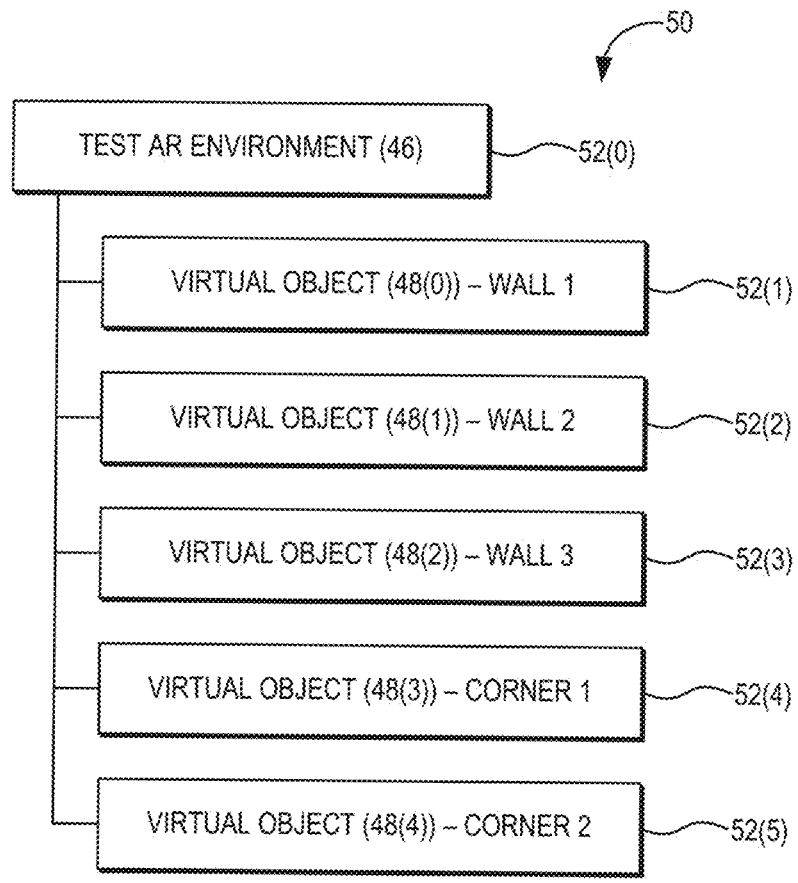
FIG. 3 illustrates an exemplary virtual object hierarchy that includes virtual objects corresponding to the virtual objects of FIG. 2, and that may be used in generating test cases, in accordance with some embodiments.

FIG. 3 illustrates an exemplary virtual object hierarchy 50, corresponding to the virtual objects 48(0)-48(4) of FIG. 2, that may be used in generating test cases, in accordance with some embodiments. For the sake of clarity, elements of FIG. 2 are referenced in describing FIG. 3. As seen in FIG. 3, the virtual object hierarchy 50 comprises nodes 52(0)-52(5), including a root node 52(0) that corresponds to the test AR environment 46 that contains the virtual objects 48(0)-48(4) of FIG. 2. The virtual objects 48(0)-48(4) of FIG. 2 are themselves represented by child nodes 52(1)-52(5), respectively, of the virtual object hierarchy 50. The virtual object hierarchy 50 thus represents the hierarchical relationships among the virtual objects 48(0)-48(4) and the test AR environment 46. Although not shown in FIG. 3, it is to be understood that some embodiments may include composite virtual objects that include one or more child virtual objects and/or virtual objects that may generate child virtual objects as a result of executing an event. In such embodiments, the child virtual objects would be represented in the virtual object hierarchy 50 by child nodes of parent nodes representing the composite virtual objects.

According to some embodiments, the virtual object hierarchy 50 may be constructed based on information regarding the virtual objects 48(0)-48(4) and their associated hierarchy provided by an AR application such as the AR application 18 of FIG. 1. Some embodiments may provide that the virtual object hierarchy 50 is constructed by performing a depth-first traversal of the virtual objects 48(0)-48(4) of the test AR environment 46. The depth-first traversal may be performed, e.g., by identifying a virtual object, adding a node corresponding to the virtual object to the plurality of nodes of the virtual object hierarchy, identifying any child virtual objects of the virtual object, adding child nodes corresponding to the child virtual objects to the plurality of nodes, and so on in recursive fashion. Although not shown in FIG. 3, it is to be understood that the nodes 52(0)-52(5) of the virtual object hierarchy 50 may also include additional information regarding, e.g., identification and/or attributes of the corresponding test AR environment 46 and the virtual objects 48(0)-48(4).

Figure 4:
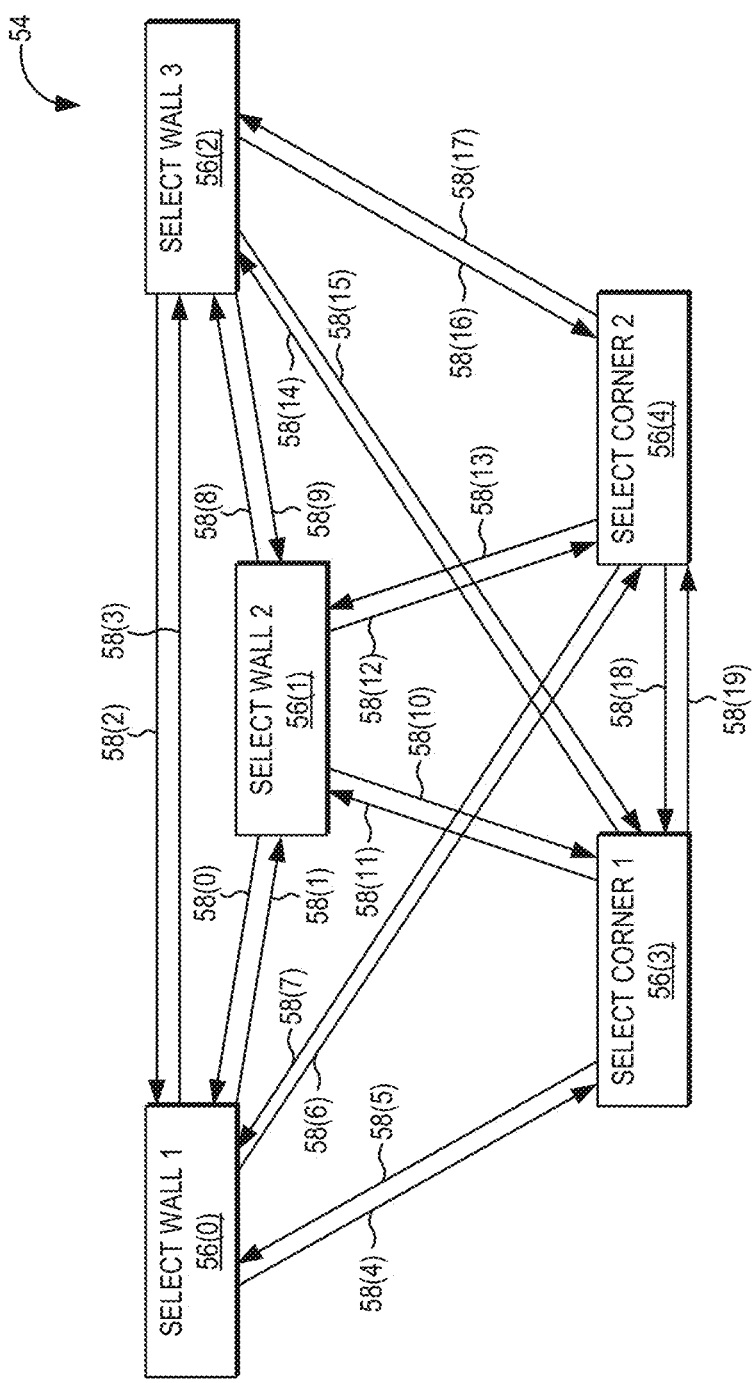
FIG. 4 illustrates an exemplary event-flow graph, showing potential event flows among the virtual objects of FIG. 2, that may be generated using the virtual object hierarchy of FIG. 3, in accordance with some embodiments.

To illustrate an exemplary event-flow graph that may be generated using the virtual object hierarchy 50 of FIG. 3 in accordance with some embodiments, FIG. 4 provides an event-flow graph 54. Elements of FIG. 2 are referenced in describing FIG. 4 for the sake of clarity. The event-flow graph 54 of FIG. 4 is a directed graph that includes a plurality of vertices 56(0)-56(4) that each correspond to an event supported by one of the virtual objects 48(0)-48(4) of FIG. 2. Accordingly, the vertex 56(0) corresponds to a select event of the virtual object 48(0) (i.e., virtual wall 1), the vertex 56(1) corresponds to a select event of the virtual object 48(1) (i.e., virtual wall 2), and so on. In some embodiments, the events corresponding to the plurality of vertices 56(0)-56(X) may be identified by traversing the plurality of nodes 28(0)-28(V) of the virtual object hierarchy 26, and querying the AR application 18 (e.g., using an API or similar mechanism) to identify events supported by the virtual objects 24(0)-24(V) corresponding to the nodes 28(0)-28(V).

As seen in FIG. 4, pairs of the vertices 56(0)-56(4) are connected by edges 58(0)-58(19) representing every possible flow between pairs of the vertices 56(0)-56(4). As discussed in greater detail below with respect to FIG. 5, the edges 58(0)-58(19) are used to generate paths representing possible event flows within the test AR environment 46.

Figure 5:
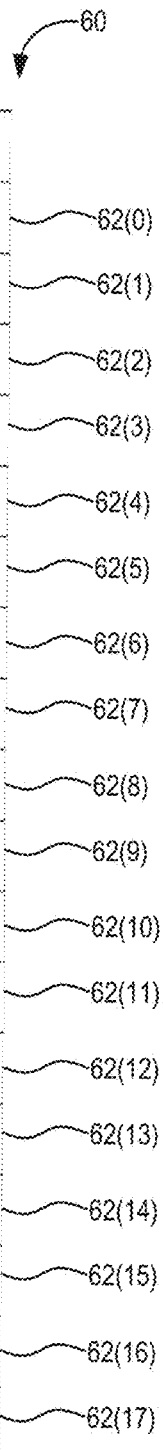
FIG. 5 illustrates exemplary paths, or sequences of events, that may be identified using the event-flow graph of FIG. 4, and that may be stored as test cases for AR application testing, in accordance with some embodiments.

FIG. 5 provides a diagram 60 illustrating exemplary paths, corresponding to the paths 36(0)-36(P) of FIG. 1, that may be identified using the event-flow graph 54 of FIG. 4, and that may be stored as test cases for AR application testing in accordance with some embodiments. Each row of the diagram 60 corresponds to one of a plurality of paths 62(0)-62(17). Each of the paths 62(0)-62(17) corresponds to a sequence of edges of the plurality of edges 58(0)-58(19) of FIG. 4 that connect two vertices of the plurality of vertices 56(0)-56(4) of FIG. 4. For example, the path 62(0) connects the vertex 56(0) ("SELECT WALL 1") and the vertex 56(4) ("SELECT CORNER 2"), and includes the edge 58(1) connecting the vertices 56(0) and 56(1), the edge 58(10) connecting the vertices 56(1) and 56(3), the edge 58(14) connecting the vertices 56(3) and 56(2), and finally the edge 58(16) connecting the vertices 56(2) and 56(4). It is to be understood that, in the example of FIG. 5, the paths 62(0)-62(17) do not represent every possible path between every pair of the vertices 56(0)-56(X) (e.g., a source vertex and a destination vertex among the plurality of vertices 56(0)-56(X)).

To illustrate an exemplary algorithm that may be employed to generate a virtual object hierarchy, such as the virtual object hierarchy 26 of FIG. 1 and the virtual object hierarchy 50 of FIG. 3, FIG. 6 is provided. FIG. 6 shows a code excerpt 64 for a function DFS-AR-Recursive that takes as input a node representing a virtual object (such as one of the virtual objects 24(0)-24(V) of the test AR environment 22 of FIG. 1), as indicated by line 66. The function first determines whether the virtual object is executable (i.e., interactive and responsive to events), as indicated by line 68. If so, the function traverses each type of event supported by the virtual object, as indicated by line 70, and executes the event, as indicated by line 72. Any child virtual objects that are generated as a result of executing the event are identified by the invokedNodes( ) method, as indicated by line 74. The child virtual objects are added as child nodes of the input node, as indicated by line 76. The function then traverses each child virtual object, as indicated by line 78, and recursively calls the DFS-AR-Recursive function using the node corresponding to the child virtual object as the input node, as indicated by line 80. In this manner, a depth-first traversal of all virtual objects may be performed and used to build the virtual object hierarchy.

FIG. 7 provides a code excerpt 82 illustrating an exemplary algorithm that may be employed to identify all possible paths (including, e.g., the paths 62(0)-62(17) of FIG. 5) between two vertices within an event-flow graph (such as the event-flow graph 54 of FIG. 4), in accordance with some embodiments. As indicated by line 84, the function getAllPaths illustrated by the code excerpt 82 takes as input an event-flow graph, a source event and a destination event (i.e., corresponding to a pair of vertices of the vertices 56(0)-56(X)), a path list "path" corresponding to a sequence of events, and a path list "paths" corresponding to a list of all generated paths. The function first marks the source event as having been visited, as indicated by line 86, and then adds the source event to the path list "path," as indicated by line 88.

The function next determines whether the source event is the same as the destination event (indicating that the path for the current iteration of the getAllPaths function has completed), as indicated by line 90. If so, the path list "path" is added to the path list "paths," as indicated by line 92. If not, the function traverses each neighbor event of the source event, as indicated by line 94, and determines whether each neighbor event has been visited, as indicated by line 96. If a neighbor event has not been visited, the function getAllPaths is recursively called using the neighbor event as the source event, as indicated by line 98. After reaching the destination event within one iteration of the getAllPaths function, the most recent event added to the path list "path" is removed, as indicated by line 100. The source event for that iteration is then marked as not having been visited, as indicated by line 102.

Figure 8A:
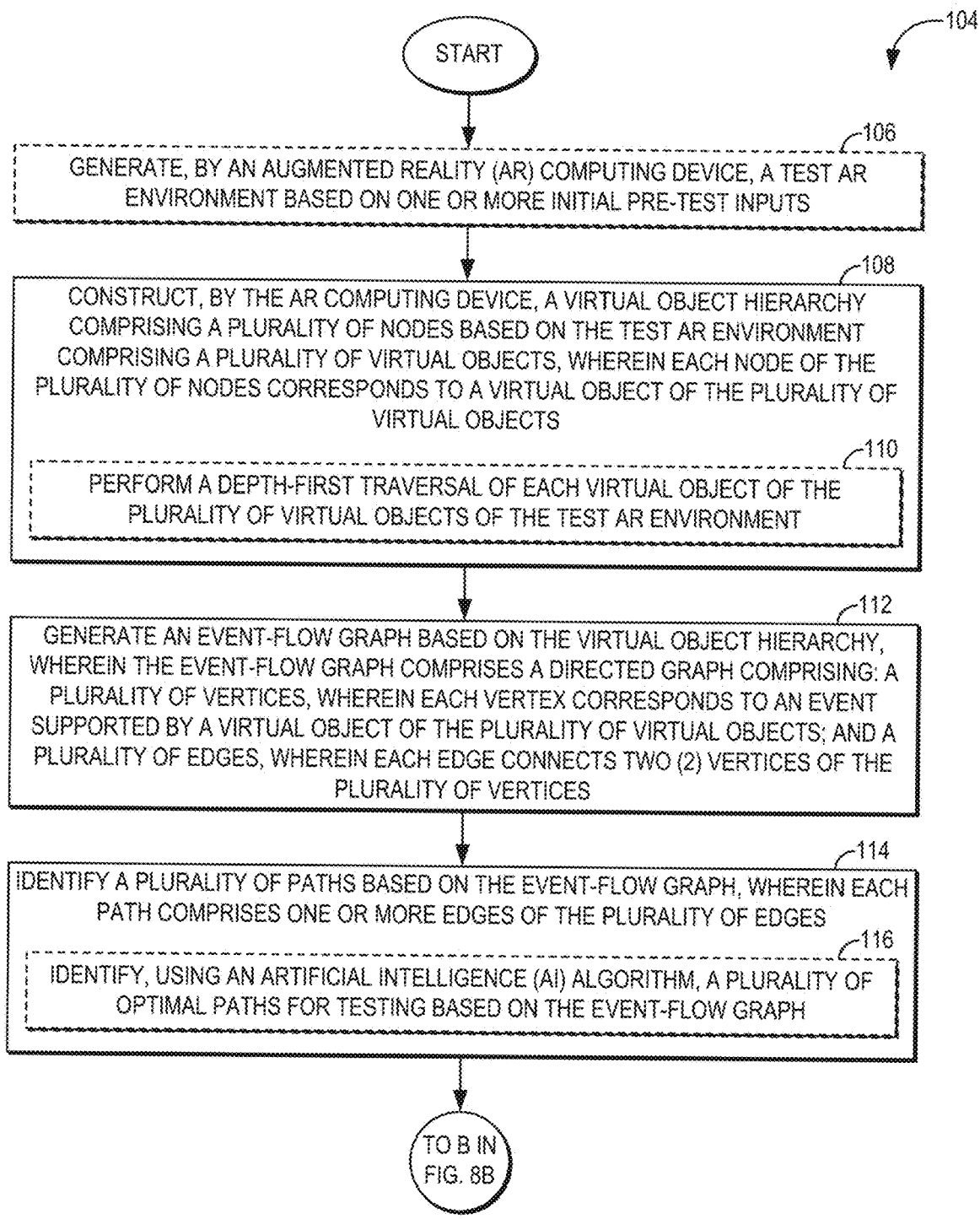
FIGS. 8A and 8B are flowcharts illustrating exemplary operations for generating test cases for AR application testing, in accordance with some embodiments.
Figure 8B:
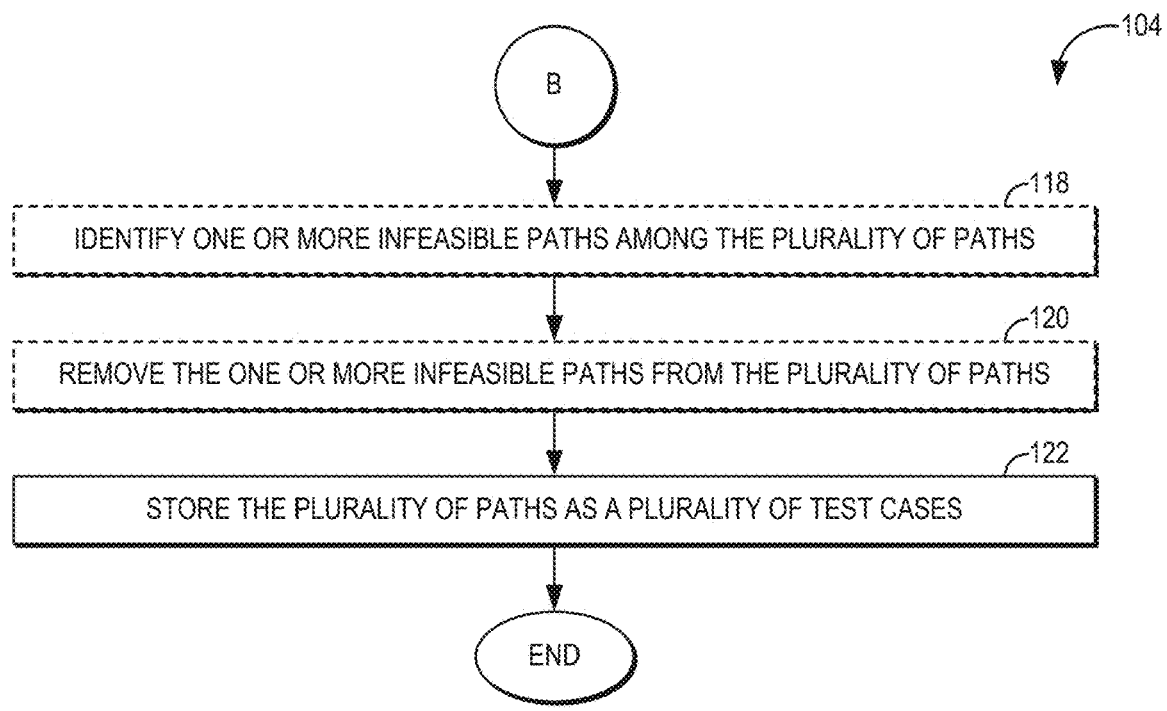

To illustrate exemplary operations for generating test cases for AR application testing in accordance with some embodiments, FIGS. 8A and 8B provide a flowchart 104. For the sake of clarity, elements of FIG. 1 are referenced in describing FIGS. 8A and 8B. In some embodiments, operations begin in FIG. 8A with the AR computing device 10 generating a test AR environment, such as the test AR environment 22, based on one or more initial pre-test inputs such as the initial pre-test input(s) 20 (block 106). The AR computing device 10 next constructs a virtual object hierarchy comprising a plurality of nodes (e.g., the virtual object hierarchy 26 comprising the plurality of nodes 28(0)-28(V) of FIG. 1) based on the test AR environment 22 comprising the plurality of virtual objects 24(0)-24(V), wherein each node of the plurality of nodes 28(0)-28(V) corresponds to a virtual object of the plurality of virtual objects 24(0)-24(V) (block 108). According to some embodiments, the operations of block 108 for constructing the virtual object hierarchy 26 may include performing a depth-first traversal of each virtual object of the plurality of virtual objects 24(0)-24(V) of the test AR environment 22 (block 110).

The AR computing device 10 then generates an event-flow graph, such as the event-flow graph 30 of FIG. 1, based on the virtual object hierarchy 26, wherein the event-flow graph 30 comprises a directed graph comprising the plurality of vertices 32(0)-32(X) (wherein each vertex corresponds to an event supported by a virtual object of the plurality of virtual objects 24(0)-24(V)) and the plurality of edges 34(0)-34(E) (wherein each edge connects two (2) vertices of the plurality of vertices 32(0)-32(X)) (block 112). The AR computing device 10 identifies a plurality of paths, such as the paths 36(0)-36(P) of FIG. 1, based on the event-flow graph 30, wherein each path comprises one or more edges of the plurality of edges 34(0)-34(E) (block 114). In some embodiments, the operations of block 114 for identifying the plurality of paths 36(0)-36(P) may include identifying, using an AI-based algorithm, a plurality of optimal paths for testing based on the event-flow graph 30 (block 116). Operations continue at block 118 of FIG. 8B.

Referring now to FIG. 8B, some embodiments may provide that the AR computing device 10 also identifies one or more infeasible paths among the plurality of paths 36(0)-36(P) (block 118). The AR computing device 10 in such embodiments may then remove the one or more infeasible paths from the plurality of paths 36(0)-36(P) (block 120). Finally, the AR computing device 10 stores the plurality of paths 36(0)-36(P) as a plurality of test cases 38(0)-38(T) (block 122).

Figure 9:
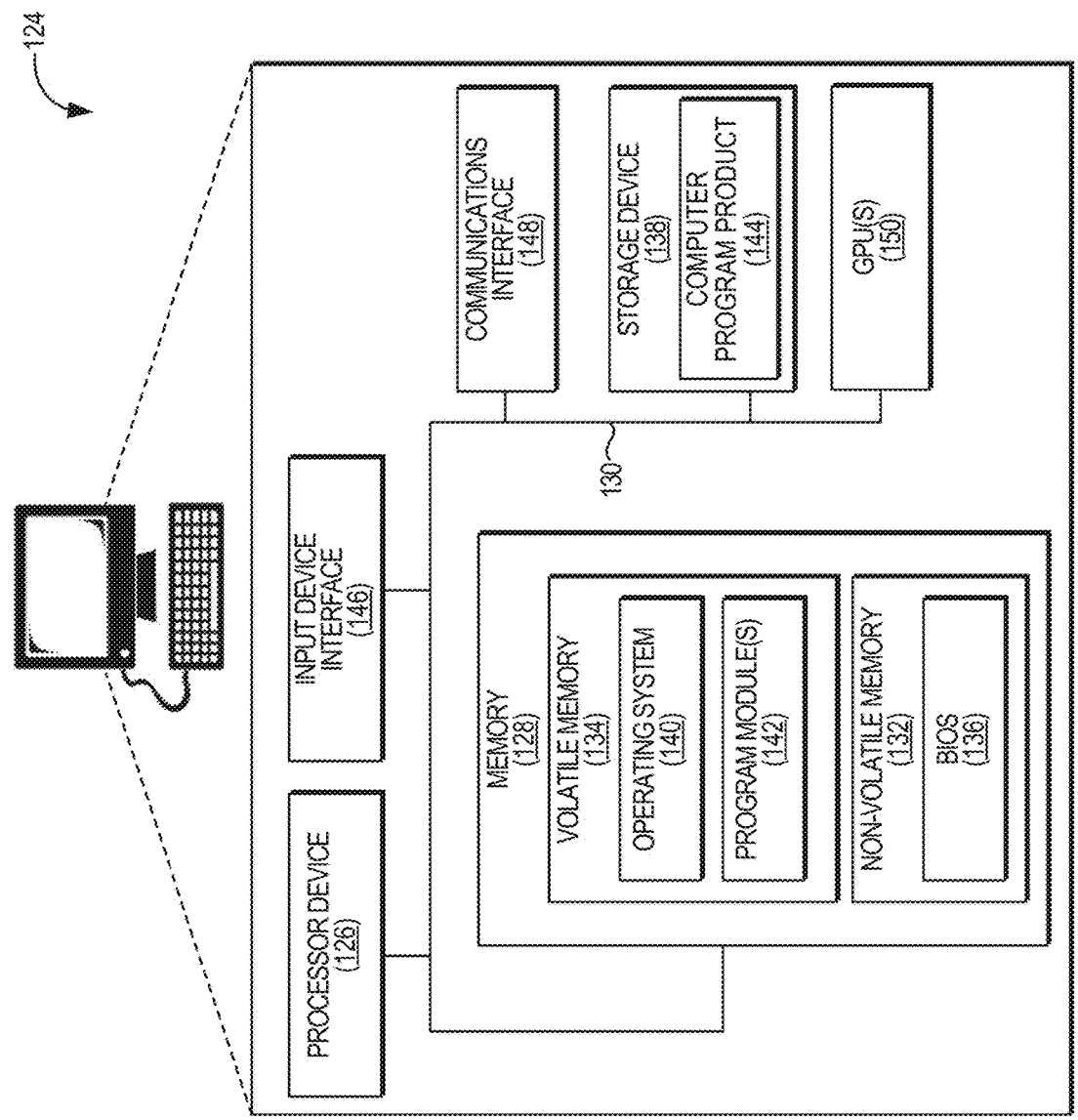
FIG. 9 is a block diagram of a computing device suitable for implementing embodiments disclosed herein.

FIG. 9 is a block diagram of a computing device 124, such as the AR computing device 10 of FIG. 1, suitable for implementing examples according to one embodiment. The computing device 124 may comprise any computing or electronic device capable of including firmware, hardware, and/or executing software instructions to implement the functionality described herein, such as a computer server or the like. The computing device 124 includes a processor device 126, a memory 128, and a system bus 130. The system bus 130 provides an interface for system components including, but not limited to, the memory 128 and the processor device 126. The processor device 126 can be any commercially available or proprietary processor.

The system bus 130 may be any of several types of bus structures that may further interconnect to a memory bus (with or without a memory controller), a peripheral bus, and/or a local bus using any of a variety of commercially available bus architectures. The memory 128 may include non-volatile memory 132 (e.g., read-only memory (ROM), erasable programmable read-only memory (EPROM), electrically erasable programmable read-only memory (EEPROM), etc.), and volatile memory 134 (e.g., random-access memory (RAM)). A basic input/output system (BIOS) 136 may be stored in the non-volatile memory 132 and can include the basic routines that help to transfer information between elements within the computing device 124. The volatile memory 134 may also include a high-speed RAM, such as static RAM, for caching data.

The computing device 124 may further include or be coupled to a non-transitory computer-readable storage medium such as a storage device 138, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 138 and other drives associated with computer-readable media and computer-usable media may provide non-volatile storage of data, data structures, computer-executable instructions, and the like. such as the VR content.

A number of modules can be stored in the storage device 138 and in the volatile memory 134, including an operating system 140 and one or more program modules 142, which may implement the functionality described herein in whole or in part. All or a portion of the examples disclosed herein may be implemented as a computer program product 144 stored on a transitory or non-transitory computer-usable or computer-readable storage medium, such as the storage device 138, which includes complex programming instructions, such as complex computer-readable program code, to cause the processor device 126 to carry out the steps described herein. Thus, the computer-readable program code can comprise software instructions for implementing the functionality of the examples described herein when executed by the processor device 126. The processor device 126 may serve as a controller, or control system, for the computing device 124 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 126 through an input device interface 146 coupled to the system bus 130 but can be connected through other interfaces such as a parallel port, an Institute of Electrical and Electronic Engineers (IEEE) 1394 serial port, a Universal Serial Bus (USB) port, an infrared (IR) interface, and the like.

The computing device 124 may also include a communications interface 148 suitable for communicating with a network as appropriate or desired. The computing device 124 includes one or more graphic processing units (GPUs) 150.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
    constructing, by an augmented reality (AR) computing device, a virtual object hierarchy comprising a plurality of nodes corresponding to a plurality of virtual objects of a test AR environment;
    generating an event-flow graph based on the virtual object hierarchy, wherein the event-flow graph comprises a directed graph comprising:
        a plurality of vertices, wherein each vertex corresponds to an event supported by a virtual object of the plurality of virtual objects; and
        a plurality of edges, wherein each edge connects two (2) vertices of the plurality of vertices;
    identifying a plurality of paths based on the event-flow graph, wherein each path comprises one or more edges of the plurality of edges; and
    storing the plurality of paths as a plurality of test cases.

2. The method of claim 1, further comprising, prior to constructing the virtual object hierarchy, generating, by the AR computing device, the test AR environment based on one or more initial pre-test inputs.

3. The method of claim 1, wherein constructing the virtual object hierarchy comprises performing a depth-first traversal of each virtual object of the plurality of virtual objects of the test AR environment.

4. The method of claim 1, wherein each event supported by a virtual object comprises one of a select event, a translate event, a rotate event, and a gesture event.

5. The method of claim 1, wherein identifying the plurality of paths comprises identifying, using an artificial intelligence (AI)-based algorithm, a plurality of optimal paths for testing based on the event-flow graph.

6. The method of claim 1, further comprising, prior to storing the plurality of paths as the plurality of test cases:
    identifying one or more infeasible paths among the plurality of paths; and
    removing the one or more infeasible paths from the plurality of paths.

7. The method of claim 6, wherein each infeasible path among the one or more infeasible paths represents an impracticable sequence of events.

8. The method of claim 6, wherein identifying the one or more infeasible paths among the plurality of paths is based on an artificial intelligence (AI)-based algorithm.

9. An augmented reality (AR) computing device, comprising:
    a system memory; and
    a processor device communicatively coupled to the system memory and configured to:
        construct a virtual object hierarchy comprising a plurality of nodes corresponding to a plurality of virtual objects of a test AR environment;
        generate an event-flow graph based on the virtual object hierarchy, wherein the event-flow graph comprises a directed graph comprising:
            a plurality of vertices, wherein each vertex corresponds to an event supported by a virtual object of the plurality of virtual objects; and
            a plurality of edges, wherein each edge connects two (2) vertices of the plurality of vertices;
        identify a plurality of paths based on the event-flow graph, wherein each path comprises one or more edges of the plurality of edges; and
        store the plurality of paths as a plurality of test cases.

10. The AR computing device of claim 9, wherein the processor device is further configured to, prior to constructing the virtual object hierarchy, generate the test AR environment based on one or more initial pre-test inputs.

11. The AR computing device of claim 9, wherein the processor device is configured to construct the virtual object hierarchy by being configured to perform a depth-first traversal of each virtual object of the plurality of virtual objects of the test AR environment.

12. The AR computing device of claim 9, wherein each event supported by a virtual object comprises one of a select event, a translate event, a rotate event, and a gesture event.

13. The AR computing device of claim 9, wherein the processor device is configured to identify the plurality of paths by being configured to identify, using an artificial intelligence (AI)-based algorithm, a plurality of optimal paths for testing based on the event-flow graph.

14. The AR computing device of claim 9, wherein the processor device is further configured to, prior to storing the plurality of paths as the plurality of test cases:
    identify one or more infeasible paths among the plurality of paths; and
    remove the one or more infeasible paths from the plurality of paths.

15. The AR computing device of claim 14, wherein each infeasible path among the one or more infeasible path represents an impracticable sequence of events.

16. The AR computing device of claim 14, wherein the processor device is configured to identify the one or more infeasible paths among the plurality of paths based on an artificial intelligence (AI)-based algorithm.

17. A non-transitory computer-readable medium having stored thereon computer-executable instructions that, when executed, cause a processor device of an augmented reality (AR) computing device to:

construct a virtual object hierarchy comprising a plurality of nodes corresponding to a plurality of virtual objects of a test AR environment;

generate an event-flow graph based on the virtual object hierarchy, wherein the event-flow graph comprises a directed graph comprising:
  a plurality of vertices, wherein each vertex corresponds to an event supported by a virtual object of the plurality of virtual objects; and
  a plurality of edges, wherein each edge connects two (2) vertices of the plurality of vertices;

identify a plurality of paths based on the event-flow graph, wherein each path comprises one or more edges of the plurality of edges; and store the plurality of paths as a plurality of test cases.

18. The non-transitory computer-readable medium of claim 17, wherein the computer-executable instructions further cause the processor device to, prior to constructing the virtual object hierarchy, generate the test AR environment based on one or more initial pre-test inputs.

19. The non-transitory computer-readable medium of claim 17, wherein the computer-executable instructions cause the processor device to construct the virtual object hierarchy by causing the processor device to perform a depth-first traversal of each virtual object of the plurality of virtual objects of the test AR environment.

20. The non-transitory computer-readable of claim 17, wherein the computer-executable instructions further cause the processor device to, prior to storing the plurality of paths as the plurality of test cases:
  identify one or more infeasible paths among the plurality of paths; and
  remove the one or more infeasible paths from the plurality of paths.

* * * * *